(12) United States Patent
Shiomi et al.

(10) Patent No.: US 6,330,048 B1
(45) Date of Patent: Dec. 11, 2001

(54) LIQUID CRYSTAL DISPLAY DEVICE

(75) Inventors: Makoto Shiomi; Takako Adachi, both of Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/377,427

(22) Filed: Aug. 19, 1999

(30) Foreign Application Priority Data

Aug. 20, 1998 (JP) ................................................ 10-234768

(51) Int. Cl.[7] .................................................. G02F 1/1339
(52) U.S. Cl. .......................................... 349/155; 349/156
(58) Field of Search ................................... 349/155, 156, 349/157

(56) References Cited

U.S. PATENT DOCUMENTS

| 5,473,450 | 12/1995 | Yamada et al. | 359/51 |
| 5,627,665 | 5/1997 | Yamada et al. | 349/156 |
| 5,643,471 | 7/1997 | Onishi et al. | 216/23 |
| 5,673,092 | 9/1997 | Horie et al. | 349/86 |
| 6,072,557 | * | 6/2000 | Kishimoto | 349/156 |
| 6,115,098 | * | 9/2000 | Kume et al. | 349/156 |

FOREIGN PATENT DOCUMENTS 10-186330  7/1998 (JP) .

\* cited by examiner

*Primary Examiner*—James A. Dudek
(74) *Attorney, Agent, or Firm*—Dike, Bronstein, Roberts & Cushman IP Group; David G. Colin; David A. Tucker

(57) ABSTRACT

A liquid crystal display device is provided, in which a liquid crystal layer made of liquid crystal having negative dielectric anisotropy is provided in a gap between a pair of substrates each having an electrode, wall-shaped convex portions are provided so as to surround display pixels on at least one of the substrates, a homeotropic alignment film is provided on a surface of each of the substrates contacting the liquid crystal layer, liquid crystal molecules in the liquid crystal layer are aligned substantially in a direction perpendicular to the pair of substrates when a voltage is not applied, and the liquid crystal molecules are axially symmetrically aligned in each of the display pixels formed by opposing portions of the electrodes when a voltage is applied. In this device, the gap between the substrates is maintained by spacers dispersed on one of the substrates after the alignment film is formed, and the number of spacers in each of the display pixels is zero or one.

9 Claims, 7 Drawing Sheets

PRIOR ART

LIQUID CRYSTAL DISPLAY DEVICE

BACKGROUND OF THE INVENTION

1. Field of the Invention

The present invention relates to a liquid crystal display device used as a display for personal computers, word processors, amusement equipment, TV apparatuses, etc. In particular, the present invention relates to a liquid crystal display device in which liquid crystal molecules in a liquid crystal layer are axially symmetrically aligned in display pixels.

2. Description of the Related Art

As means for improving viewing angle characteristics of a liquid crystal display device, Japanese Laid-Open Publication No. 8-278504 discloses a liquid crystal display device in which liquid crystal molecules are axially symmetrically aligned in display pixels.

Hereinafter, the above-mentioned liquid crystal display device will be described with reference to FIGS. 8A and 8B. FIG. 8A is a plan view of the liquid crystal display device, and FIG. 8B is a cross-sectional view thereof.

In the above-mentioned liquid crystal display device, an active matrix substrate 401a includes a glass substrate 301a on which transparent electrodes 302a are provided. A first insulating layer 310a made of black resin is patterned on the transparent electrodes 302a so as to surround display pixels, and a second insulating layer 310b in a column shape is formed on the first insulating layer 310a. The second insulating layer 310b is formed by spin-coating a negative photoresist mixed with 0.1% by weight of spacers, and exposing the photoresist to light through a mask, followed by development and patterning.

The active matrix substrate 401a is attached to a counter substrate 401b in which a transparent electrode 302b is provided on a glass substrate 301b. Thus, a liquid crystal panel is constructed. Herein, spacers for keeping a cell gap between the substrates are fixed outside display pixels by the resist, and are not present in the display pixels.

A liquid crystal layer is interposed in the gap between the substrates, which includes liquid crystal regions 303 in the display pixels and polymer regions 304 outside the display pixels. The liquid crystal layer is produced as follows: a mixture of a polymerizable resin material and a liquid crystal material having positive dielectric anisotropy is injected into the liquid crystal panel, and UV-rays are irradiated to the mixture under the application of a voltage of about 2.5 volts at about 60 Hz and a temperature which renders the mixture uniform, whereby the resin is cured. After being cooled to about 40° C. over 5 hours under the application of a voltage, the liquid crystal panel is returned to room temperature, and the resin is completely polymerized by UV irradiation. As a result, the polymerizable resin material is preferentially separated on the insulating layer, whereby the polymer regions 304 are formed outside the display pixels. The liquid crystal regions 303 in the display pixels are in a mono-domain state, and the liquid crystal molecules are axially symmetrically aligned therein.

In the above-mentioned liquid crystal display device, liquid crystal molecules are axially symmetrically aligned with respect to a central portion of a domain when no voltage is applied. Under the application of a voltage, liquid crystal molecules rise in an axially symmetrical direction. Accordingly, an apparent refractive index seen in each direction is rendered uniform, which improves viewing angle characteristics.

Another method is also disclosed, for mask-printing a resist material mixed with spacers onto a substrate to provide the spacers at predetermined positions. Furthermore, a structure in which a resist without being mixed with spacers may be provided up to the same height as that of a cell gap, whereby the cell gap is maintained only by the resist. Furthermore, there is disclosed a method for fixing spacers at predetermined positions by coating and patterning a resist, dispersing spacers in a dry state, and further coating and patterning a resist. Furthermore, a method for fixing spacers at predetermined positions in display pixels by a resist is also disclosed.

According to the above-mentioned prior art, after a resist material mixed with spacers is spin-coated onto a substrate, the resist material is baked and exposed to light through a mask, followed by development, whereby the spacers are fixed at predetermined positions. In this case, when the substrate is soaked in a developer to develop the resist, the spacers mixed with the resist enter the developer together with the resist. Therefore, the developer is contaminated, which necessitates the use of a larger amount of developer.

On the other hand, according to the method for mask-printing a resist material mixed with spacers onto a substrate using a screen plate so as to fix the spacers at predetermined positions, it is difficult to print the resist at a minute pitch.

Alternatively, in the case of keeping a cell gap only by a resist without being mixed with spacers, the resist is required to be provided up to the same height as that of the cell gap. Thus, the volume of the resist contained in a liquid crystal panel becomes larger, compared with the case where a resist material is mixed with spacers. Some resin material and resist material are unlikely to discharge all the air adsorbed thereto or contained therein. Therefore, in the case where liquid crystal is injected into a liquid crystal panel containing a large amount of resist by a vacuum injection method, the deaeration time of the liquid crystal panel becomes long depending upon the kind of material.

Furthermore, according to the method for coating and patterning black resin, dispersing spacers in a dry state, and further coating and patterning a resist to fix spacers at predetermined positions, the number of steps is large.

According to the above-mentioned prior art, a method for fixing spacers at predetermined positions in display pixels by a resist is disclosed. However, in the case where a plurality of spacers are provided in one display pixel, the following problem arises.

In the case where liquid crystal molecules are axially symmetrically aligned, axially symmetrical alignment is likely to be formed with respect to an uneven portion of a substrate. Therefore, the liquid crystal molecules are likely to be axially symmetrically aligned with respect to the positions at which spacers are provided. In the case where a plurality of spacers are present in one display pixel, a plurality of centers for axial symmetry are generated in one display pixel.

When the liquid crystal molecules are axially symmetrically aligned, a rising direction of the liquid crystal molecules around the center for axial symmetry changes by 360°. Therefore, in the case where one center for axial symmetry is present in a display pixel, viewing angles seen in each slanting direction compensate for each other, whereby wide viewing angle characteristics can be obtained. However, in the case where a plurality of centers for axial symmetry are generated caused by spacers present irregularly in one display pixel, an apparent refractive index seen in each direction is not rendered sufficiently uniform.

Therefore, roughness is observed in a slanting direction, and a display quality is decreased.

In the case where spacers are not present at central portions of display pixels, the effect of compensating for viewing angle is decreased. Therefore, roughness is observed in a slanting direction, and the display quality is decreased.

SUMMARY OF THE INVENTION

A liquid crystal display device is provided, in which a liquid crystal layer made of liquid crystal having negative dielectric anisotropy is provided in a gap between a pair of substrates each having an electrode, wall-shaped convex portions are provided so as to surround display pixels on at least one of the substrates, a homeotropic alignment film is provided on a surface of each of the substrates contacting the liquid crystal layer, liquid crystal molecules in the liquid crystal layer are aligned substantially in a direction perpendicular to the pair of substrates when a voltage is not applied, and the liquid crystal molecules are axially symmetrically aligned in each of the display pixels formed by opposing portions of the electrodes when a voltage is applied, wherein the gap between the substrates is maintained by spacers dispersed on one of the substrates after the alignment film is formed, and the number of spacers in each of the display pixels is zero or one.

In one embodiment of the present invention, one spacer is disposed at a central portion of each of the display pixels.

In another embodiment of the present invention, the pair of substrates comprise an active matrix substrate and a color filter substrate, wherein the wall-shaped convex portions are provided on the color filter substrate, and the spacers are dispersed on the active matrix substrate.

A liquid crystal display device is provided, in which a liquid crystal layer made of liquid crystal having positive dielectric anisotropy is provided in a gap between a pair of substrates each having an electrode, wall-shaped convex portions are provided so as to surround display pixels on at least one of the substrates, liquid crystal molecules in the liquid crystal layer are axially symmetrically aligned in each of the display pixels formed by opposing portions of the electrodes when no voltage is applied, and the liquid crystal molecules rise in a direction substantially perpendicular to the pair of substrates in an axial symmetrical direction when a voltage is applied, wherein the gap between the substrates is maintained by spacers dispersed on the substrate having no wall-shaped convex portions, and the number of spacers in each of the display pixels is zero or one.

In one embodiment of the present invention, one spacer is disposed at a central portion of each of the display pixels.

In another embodiment of the present invention, the pair of substrates comprise an active matrix substrate and a color filter substrate, wherein the wall-shaped convex portions are provided on the color filter substrate, and the spacers are dispersed on the active matrix substrate.

A liquid crystal display device is provided, in which a liquid crystal layer made of liquid crystal having positive dielectric anisotropy is provided in a gap between a pair of substrates each having an electrode, wall-shaped convex portions are provided so as to surround display pixels on at least one of the substrates, liquid crystal molecules in the liquid crystal layer are axially symmetrically aligned in each of the display pixels formed by opposing portions of the electrodes when no voltage is applied, and the liquid crystal molecules rise in a direction substantially perpendicular to the pair of substrates in an axial symmetrical direction when a voltage is applied, wherein the gap between the substrates is maintained by spacers dispersed on one of the substrates after the wall-shaped convex portions are formed, and the number of spacers in each of the display pixels is zero or one.

In one embodiment of the present invention, one spacer is disposed at a central portion of each of the display pixels.

In another embodiment of the present invention, the pair of substrates comprise an active matrix substrate and a color filter substrate, wherein the wall-shaped convex portions are provided on the color filter substrate, and the spacers are dispersed on the active matrix substrate.

Hereinafter, the function of the present invention will be described.

According to the present invention, wall-shaped convex portions are formed around display pixels, using a resin material, a homeotropic alignment film is formed on the wall-shaped convex portions, and spacers are dispersed on the homeotropic alignment film. Therefore, when the resin material is developed after being exposed to light for patterning, the developer is not contaminated by the spacers, and a large amount of developer is not required. The spacers may be dispersed on the substrate having no wall-shaped convex portions. In a structure having no alignment film, the spacers can be dispersed on the substrate having no wall-shaped convex portions, or dispersed on the substrate after the wall-shaped convex portions are formed. Furthermore, the wall-shaped convex portions may be provided on one substrate or on both the substrates.

According to the present invention, the spacers maintain a cell gap, which makes it unnecessary to prescribe the wall-shaped convex portions to be as high as the cell gap. Therefore, the amount of a resist contained i the liquid crystal panel will not be increased. Thus, even when a resin material which is unlikely to discharge air is used, the deaeration time of the liquid crystal panel can be shortened.

Furthermore, since the spacers are not fixed by a resist, the number of production steps can be decreased, and the pitch can be controlled more easily than the case of printing a resist.

The number of spacers is prescribed to be 0 or 1 in each display pixel. Therefore, a plurality of centers for axial symmetry are not caused by a plurality of spacers in the display pixels. Since the direction in which liquid crystal molecules rise around the center for axial symmetry change by 360° in one display pixel, the areas of the regions where the direction in which the liquid crystal molecules rise are different can be rendered uniform. Thus, a diagonally observed viewing angle can be compensated in one display pixel, whereby wide viewing angle characteristics can be obtained.

Furthermore, one spacer is disposed at the central portion of each display pixel, whereby an effect of compensating for a viewing angle can be maximized.

Thus, the invention described herein makes possible the advantage of providing a high-quality liquid crystal display device having wide viewing angle characteristics without roughness due to axially symmetrical alignment of liquid crystal molecules, which can be produced in smaller production steps for a shorter production period of time without requiring a large amount of developer.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments.

(Shape and Material of Spacers)

According to the present invention, a cell gap between a pair of substrates opposed to each other so as to interpose a liquid crystal layer therebetween is maintained by spacers dispersed on the surface of one substrate.

Spacers made of plastic, glass, or the like can be used. Spacers can have a shape such as a cube, a rectangular solid, and a cylinder. In the case where the spacers are in the shape of a cube, a rectangular solid, or a cylinder, each corner is desirably smoothed so as not to damage an alignment film.

In the case of a spherical spacer, the diameter of the spacer can be prescribed to be equal to or smaller than a cell gap. In the case of a cubic spacer, the side length of the spacer can be prescribed to be equal to or smaller than a cell gap. In the case of a rectangular spacer, the length of the shortest side of the spacer can be prescribed to be equal to or smaller than a cell gap. Also, in the case of a rectangular spacer, spacers are dispersed on the surface of one substrate and pressed between substrates attached to each other, whereby the gap between the substrates can be maintained by the shortest side of the spacer. Furthermore, in the case of a cylindrical spacer, the spacers are pressed between substrates attached to each other, whereby the side surfaces of the spacers come into contact with the substrates when the diameter of the circular portion is smaller than the height of the cylinder, and top and bottom surfaces of the cylinder come into contact with the substrates when the diameter of the circular portion is larger than the height of the cylinder, to keep the cell gap.

The surface of the spacer may be coated with heat-reactive or photoreactive resin.

(Number of Spacers)

According to the present invention, the number of spacers in a display pixel is 0 or 1. The reason for this will be described with reference to FIGS. 1A to 1C.

Figure 1A:
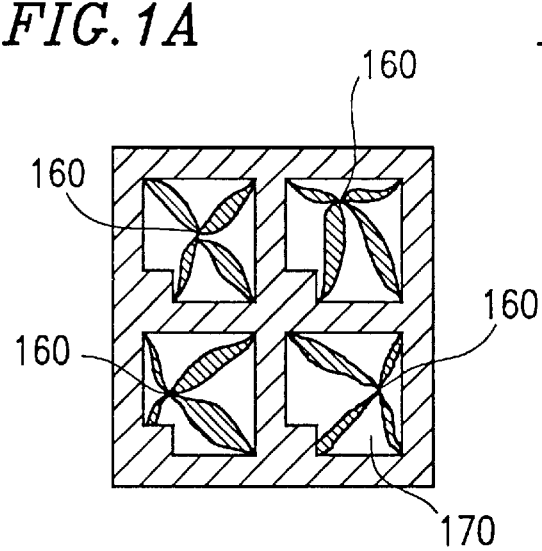
FIGS. 1A through 1C show states of display pixels observed in crossed-Nicols under the application of a voltage to a liquid crystal display device in one embodiment of the present invention.
Figure 1B:
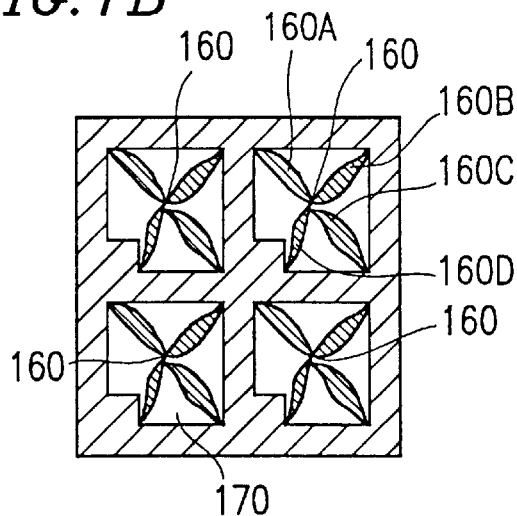
Figure 1C:
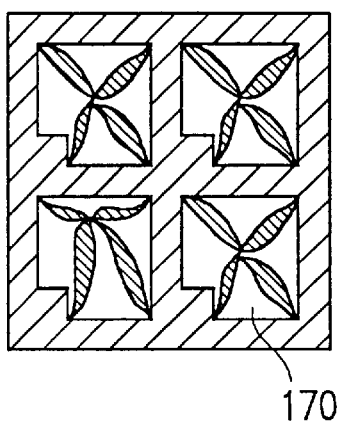

FIGS. 1A through 1C show display pixels observed in crossed-Nicols under the application of a voltage in a liquid crystal display device of the present invention using liquid crystal having negative dielectric anisotropy. In the case of using liquid crystal having positive dielectric anisotropy, the same states as shown in FIGS. 1A through 1C are obtained when a voltage is not applied.

With a structure in which liquid crystal molecules are axially symmetrically aligned by providing a wall-shaped convex portion around each display pixel, a center for axial symmetry is likely to occur at a concave and convex portion of a substrate.

Thus, in the case where one spacer is present in display pixel, a center for axial symmetry occurs at a position 160 where a spacer is present in a display pixel (in a pixel opening portion 170), as shown in FIG. 1A. Since the rising direction of liquid crystal molecules around the center for axial symmetry changes by 360°, a diagonally observed viewing angle can be compensated in one display pixel, whereby wide viewing angle characteristics can be obtained.

Furthermore, as shown in FIG. 1B, in the case where a spacer is disposed at a central portion of a display pixel, a center for axial symmetry occurs at the position 160, so that the areas of regions 160A, 160B, 160C, and 160D where the rising direction of the liquid crystal molecules is different become equal to each other. As a result, a high quality liquid crystal display device is obtained, in which there is no roughness observed even in a diagonal direction.

Next, in the case where there are no spacers in a display pixel, one center for axial symmetry occurs in a display pixel, regulated by a wall around a display pixel, as shown in FIG. 1C. Since the rising direction of liquid crystal molecules around the center for axial symmetry changes by 360°, a diagonally observed viewing angle can be compensated in one display pixel, whereby wide viewing angle characteristics can be obtained.

Figure 2:
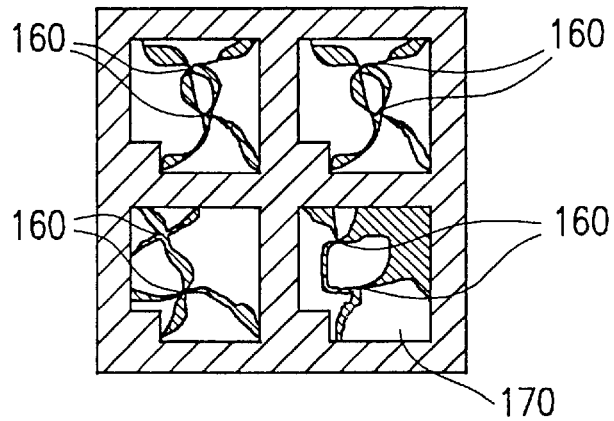
FIG. 2 shows a state of display pixels observed in crossed-Nicols under the application of a voltage to a liquid crystal display device in which a plurality of spacers are present in each display pixel.

In contrast, in the case where a plurality of spacers are provided in a display pixel, a plurality of centers for axial symmetry occur under the application of a voltage, as shown in FIG. 2. The rising direction of liquid crystal molecules around a center for axial symmetry changes by 360°. However, there are a plurality of centers for axial symmetry, the areas of regions where the rising direction of liquid crystal molecules are different do not become equal to each other, whereby an effect of compensating for a viewing angle is decreased.

In the case where there are no spacers in a display pixel, a cell gap can be maintained by providing spacers outside the display pixel. Furthermore, even in the case where one spacer is present in a display pixel, spacers may be provided outside the display pixel.

(Method for Disposing Spacers)

According to the present invention, in the case of using liquid crystal having negative dielectric anisotropy, spacers are dispersed on a substrate after a homeotropic alignment film is formed. In the case of using liquid crystal having positive dielectric anisotropy, spacers are dispersed on a substrate having no wall-shaped convex portions, or spacers are dispersed after wall-shaped convex portions are formed.

The spacers can be dispersed by an ordinary dry dispersion method.

The dry dispersion method is performed as follows a substrate is placed in a dispersion apparatus, spacers are dispersed in the air in a sealed container by injecting gas, and the spacers are allowed to naturally drop onto the substrate, whereby the spacers are disposed on the substrate.

At this time, the injection time of injecting gas for spacers and a period of time during which the substrate is exposed to the air containing the spacers can be set in such a manner that the number of spacers in a display pixel becomes 0 or 1.

Figure 3:
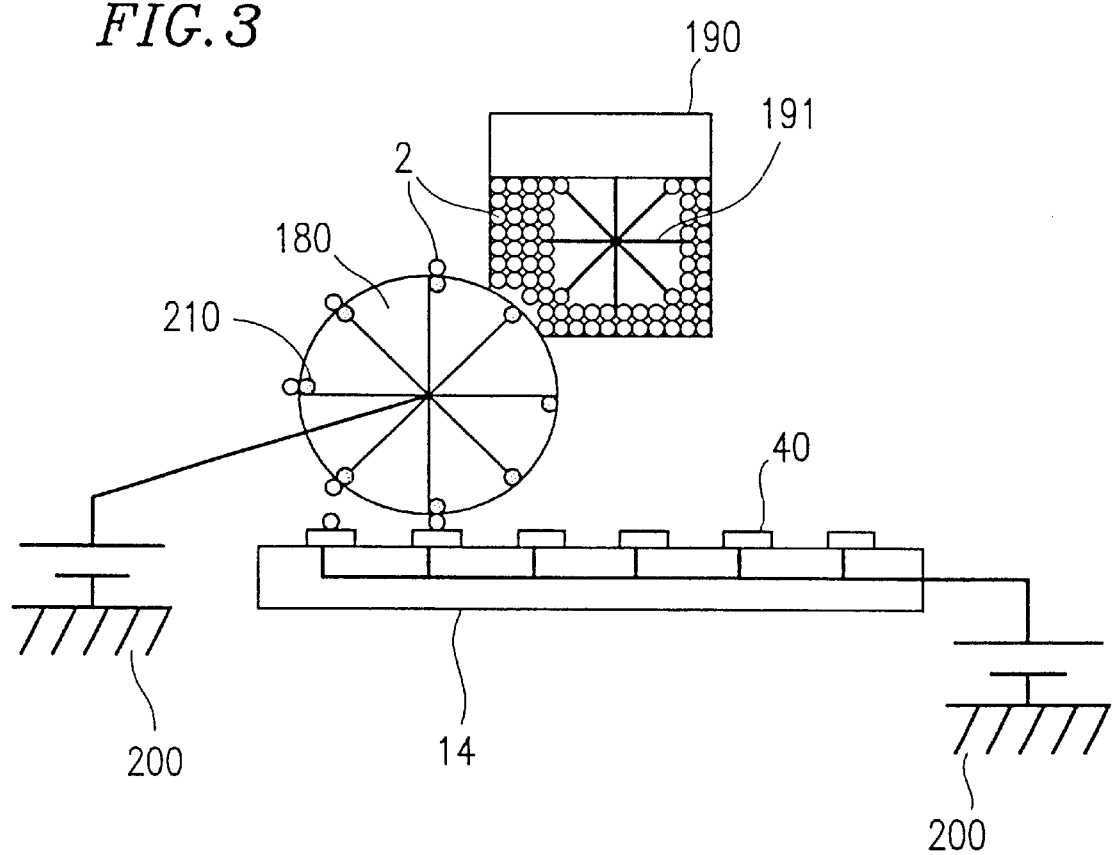
FIG. 3 illustrates a method for disposing spacers at predetermined positions in a display pixel.

In order to dispose a spacer 2 at a central portion of a display pixel, for example as shown in FIG. 3, the spacer 2 is, for example, negatively charged, adsorbed to a rotary roller 180 which is charged opposite to that of the spacer 2 in a predetermined pattern, and thereafter, the rotary roller 180 is brought close to a substrate 14, whereby the spacer 2 is disposed at a predetermined position on a transparent electrode 40.

The spacers 2 are charged by stirring the spacers 2 in a spacer box 190 with a stirring roller 191. The rotary roller 180 can be charged in a predetermined pattern by forming an electrode pattern on the circumference of the rotary roller 180.

In order for the spacer 2 to be adsorbed to the substrate 14 from the rotary roller 180 when the rotary roller 180 is brought close to the substrate 14, the transparent electrodes 40 of the substrate 14 are charged at a higher potential than the rotary roller 180 by a high-voltage power source 200, whereby the spacers 2 can be disposed on the substrate 14. Alternatively, the electrode of the rotary roller 180 is charged so that the spacers 2 repel the electrode, whereby the spacers 2 can be disposed on the substrate 14.

Furthermore, in order that the spacers 2 are disposed at predetermined positions of the substrate 14, the electrode of the rotary roller 180 is synchronized with the predetermined position of the substrate 14, whereby the rotary roller 180 can be rotated.

(Method for Forming Axially Symmetrical Alignment)

(1) In the case of a liquid crystal material having negative dielectric anisotropy In this case, a homeotropic alignment film is formed on the surface of a substrate so as to come into contact with a liquid crystal layer, and wall-shaped convex portions are formed so as to surround display pixels on at least one substrate.

Figure 4A:
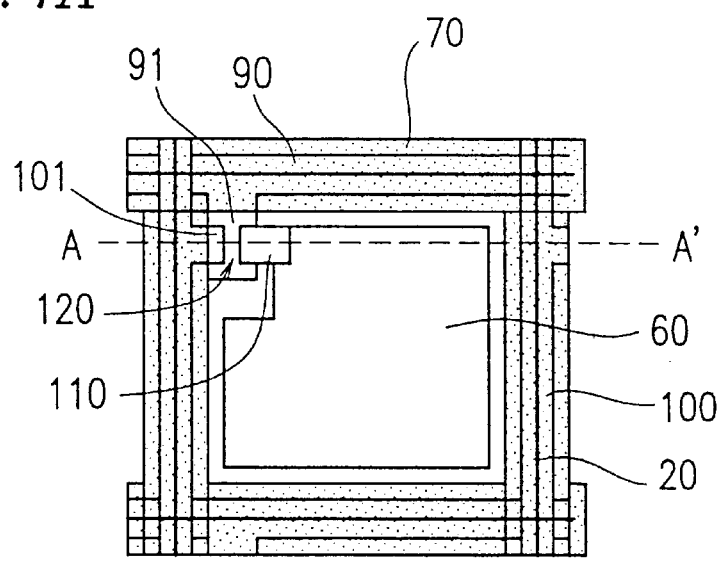
FIGS. 4A and 4B show a structure of a liquid crystal display device in one embodiment of the present invention.
Figure 4B:
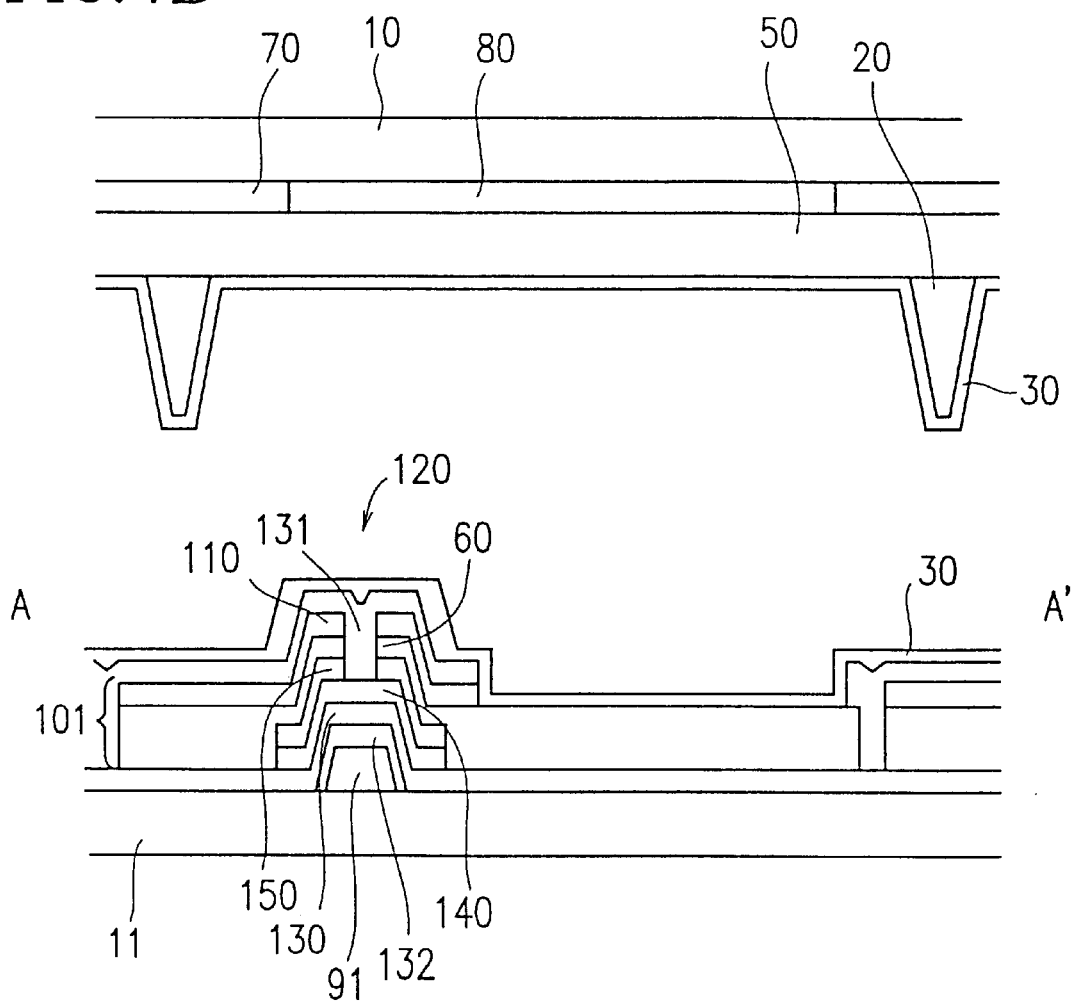

Hereinafter, one embodiment of the liquid crystal display device of the present invention will be described with reference to FIGS. 4A and 4B. FIG. 4A is a plan view of one pixel, and FIG. 4B is a cross-sectional view taken along a line A–A' in FIG. 4A.

In the above-mentioned liquid crystal display device, an active matrix substrate, on which TFTs 120 and transparent electrodes 60 for display are provided in a matrix, is disposed so as to oppose to a color filter (CF) substrate on which coloring portions 80 and a black matrix (BM) 70 are formed.

In the active matrix substrate, gate lines 90 and source lines 100 are provided on a glass substrate 11 so as to cross each other. The TFT 120 is provided in the vicinity of each crossed portion of the gate lines 90 and the source lines 100, and the transparent electrode 60 is provided in each region partitioned by the gate lines 90 and the source lines 100. In the TFT 120, an a-Si layer 140 is provided on a gate electrode 91 which is branched from the gate line 90 via insulating films 130 and 132, and an $N^+$-a-Si layer 150 which is divided into two portions is provided on the a-Si layer 140. On one portion of the $N^+$-a-Si layer 150, a transparent electrode 60 for display and a drain electrode 110 are formed. On the other portion of the $N^+$-a-Si layer 150, a source electrode 101 with a double-layer structure, branched from the source line 100, is provided. An insulating film 131 is provided so as to cover the TFT 120 and the source line 100. Each of the gate lines 90, the source lines 100, the TFTs 120, and the transparent electrode 60 can be produced by an ordinary method.

In the CF substrate, the coloring portions 80 are provided on the glass substrate 10 so as to correspond to each display pixel, and the BM 70 is provided around each display pixel. A common transparent electrode 50 is provided on the coloring portions 80 and the BM 70, and wall-shaped convex portions 20 are provided on the common transparent electrode 50 so as to surround display pixels. The coloring portions 80, the BM 70, and the common transparent electrode 50 can be produced by an ordinary method. The wall-shaped convex portions 20 can be formed by coating a resin material such as JAS 100 (produced by Japan Synthetic Rubber Co., Ltd.), followed by patterning by a photolithography method.

A homeotropic alignment film 30 is provided on each substrate. JAL 204 produced by Japan Synthetic Rubber Co., Ltd., for example, can be used for the homeotropic alignment film 30. A homeotropic vapor-deposited film of $SiO_2$, a polyimide film, or the like can also be used for the homeotropic alignment film 30.

After spacers are dispersed on the active matrix substrate, the active matrix substrate is attached to the CF substrate, and liquid crystal having negative dielectric anisotropy is injected therebetween, whereby a liquid crystal display device is produced. As nematic liquid crystal having negative dielectric anisotropy, for example, ZLI4788-000 (produced by Merck & Co., Inc.) can be used.

In the above-mentioned liquid crystal display device, the substrate surface which is in contact with the liquid crystal layer is covered with the homeotropic alignment film 30, so that liquid crystal molecules are aligned substantially in a direction perpendicular to the substrate in an initial state when a voltage is not applied. When a voltage is applied, the direction in which liquid crystal molecules fall is controlled by the wall-shaped convex portions 20 provided around display pixels. Thus, the liquid crystal molecules fall toward one point in each display pixel, whereby the liquid crystal molecules are axially aligned in each display pixel with respect to one point.

The wall-shaped convex portions 20 may be formed on the active matrix substrate, and the spacers may be dispersed on the CF substrate.

(2) In the case of a liquid crystal material having positive dielectric anisotropy.

In this case, the wall-shaped convex portions 20 are formed on at least one substrate so as to surround display pixels, and a liquid crystal material mixed with a polymerizable resin material is injected between the substrates.

The active matrix substrate and the CF substrate can have the same structures as those shown in FIGS. 4A and 4B, except that the homeotropic alignment film 30 is not provided. Furthermore, if required, a structure in which a horizontal alignment film is provided may be adopted.

After spacers are dispersed on the active matrix substrate, the active matrix substrate is attached to the CF substrate, and a mixture containing a photopolymerizable resin material and liquid crystal having positive dielectric anisotropy is injected therebetween. ZLI 4792, for example, (produced by Merck & Co., Inc.) can be used as nematic liquid crystal having positive dielectric anisotropy. After the injection of the mixture, the mixture is irradiated with UV-rays under the application of a voltage at a temperature which is equal to or higher than the temperature which renders the mixture uniform, whereby the resin is cured. While the voltage is being applied, the mixture is gradually returned to room temperature, and irradiated with UV-rays, whereby the resin is completely polymerized.

Accordingly, the polymerization resin material is preferentially separated on the wall-shaped convex portions 20 to form polymer regions outside the display pixels. In the display pixels, a liquid crystal layer is in a mono-domain state, and liquid crystal molecules are axially symmetrically aligned.

In the above-mentioned liquid crystal display device, liquid crystal molecules are axially symmetrically aligned in display pixels in an initial state when a voltage is not applied. When a voltage is applied, the liquid crystal molecules rise in an axially symmetrical direction.

The wall-shaped convex portions 20 may be formed on the active matrix substrate, and the spacers may be dispersed on the CF substrate.

(Alignment State of Liquid Crystal Molecules)

Figure 5A:
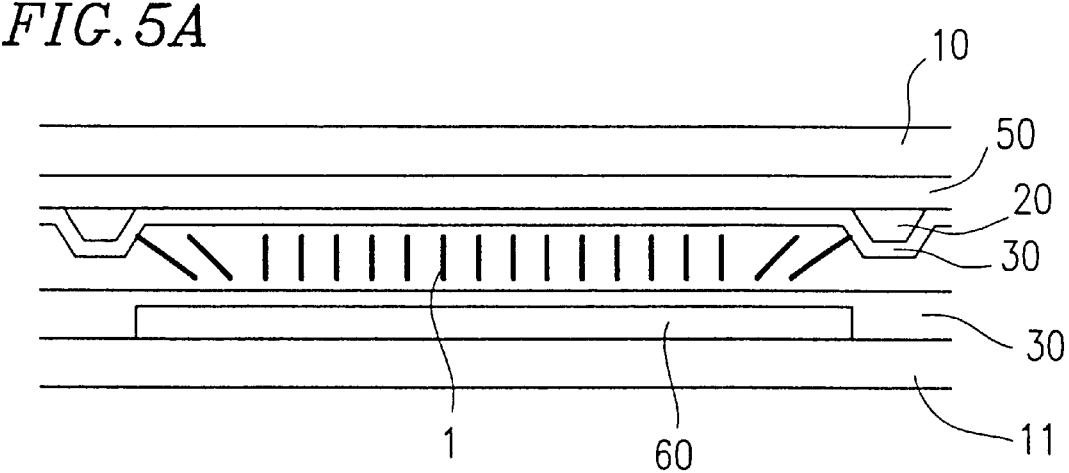
FIGS. 5A through 5C are cross-sectional views showing alignment states of liquid crystal molecules in the case where spacers are not present in display pixels in the liquid crystal display device in one embodiment of the present invention.

(1) In the case of a liquid crystal material having negative dielectric anisotropy In the case where there are no spacers in display pixels, when a voltage is not applied to a liquid crystal layer, liquid crystal molecules 1 are aligned substantially perpendicular to a substrate, as shown in FIG. 5A. The liquid crystal molecules 1 at the wall-shaped convex portions 20 are aligned substantially perpendicular to the surface of the alignment film 30, so that the liquid crystal molecules 1 at the wall-shaped convex portions 20 are inclined with respect to the substrate. The liquid crystal molecules 1 have a nature as a continuous entity, so that the liquid crystal molecules 1 in the vicinity of the wall-shaped convex portions 20 are inclined with respect to the substrate, being affected by the liquid crystal molecules 1 at the wall-shaped convex portions 20.

Figure 5B:
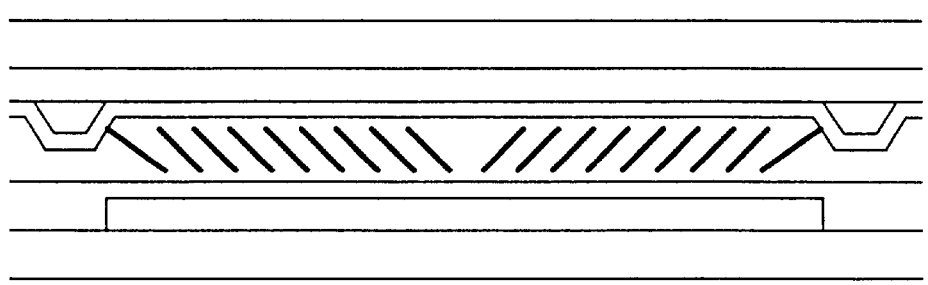

When a gray-scale voltage is applied to the liquid crystal layer, the liquid crystal molecules 1 in the vicinity of the wall-shaped convex portions 20 fall along an inclined surface of the wall-shaped convex portions 20 so as to be stable in terms of energy within the shortest period of time, as shown in FIG. 5B. The liquid crystal molecules 1 have a nature as a continuous entity, so that the liquid crystal molecules 1 in the entire display pixels fall along an inclined surface of the wall-shaped convex portions 20.

Figure 5C:
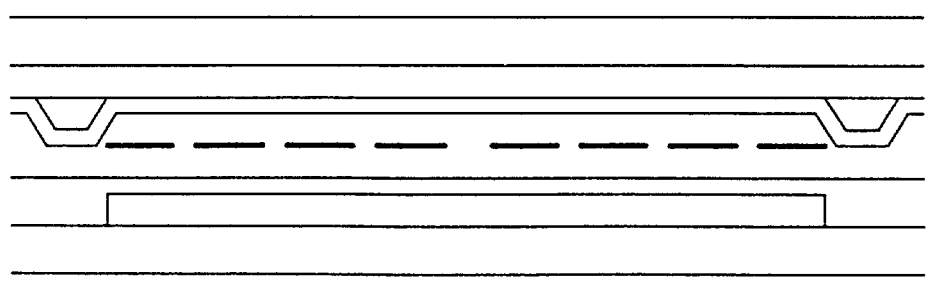

In the case where a saturation voltage is applied to the liquid crystal layer, the liquid crystal molecules 1 are aligned substantially parallel to the substrate, as shown in FIG. 5C. The liquid crystal molecules 1 are axially symmetrically aligned with respect to the center of each display pixel.

Figure 6A:
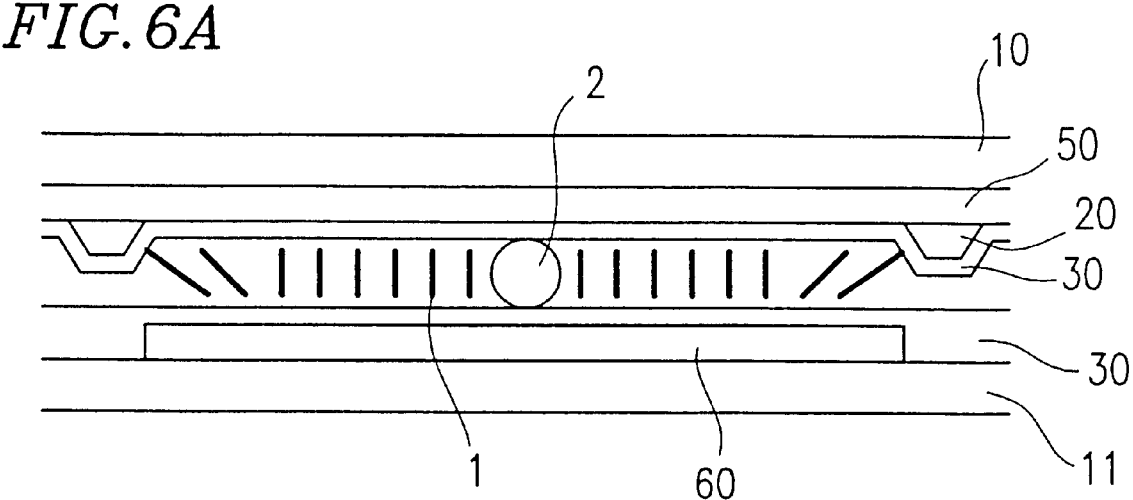
FIGS. 6A through 6C are cross-sectional views showing alignment states of liquid crystal molecules in the case where one spacer is present in each display pixel in the liquid crystal display device in one embodiment of the present invention.

In the case where there is one spacer in a display pixel, when a voltage is not applied to the liquid crystal layer, the liquid crystal molecules 1 are aligned substantially perpendicular to a substrate, as shown in FIG. 6A. The liquid crystal molecules 1 at the wall-shaped convex portions 20 are aligned substantially perpendicular to the surface of the alignment film 30, so that the liquid crystal molecules 1 are inclined with respect to the substrate. The liquid crystal molecules 1 have a nature as a continuous entity, so that the liquid crystal molecules 1 in the vicinity of the wall-shaped convex portions 20 are inclined with respect to the substrate, being affected by the liquid crystal molecules 1 at the wall-shaped convex portions 20. Furthermore, the liquid crystal molecules 1 at the spacer 2 are aligned in a direction perpendicular to the substrate along the surface of the spacer 2.

Figure 6B:
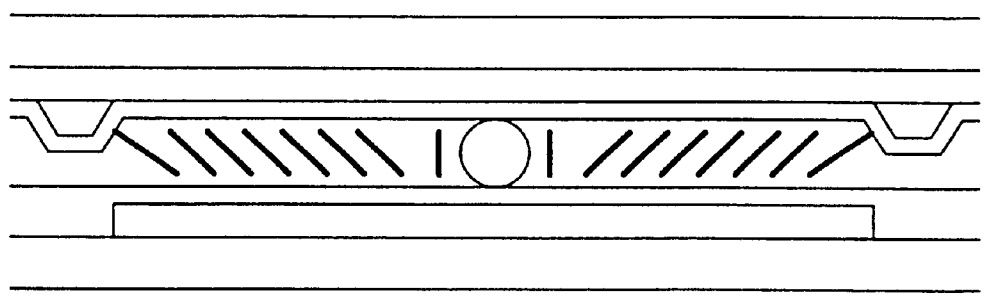

When a gray-scale voltage is applied to the liquid crystal layer, the liquid crystal molecules 1 in the vicinity of the wall-shaped convex portions 20 fall along an inclined surface of the wall-shaped convex portions 20 so as to be stable in terms of energy within the shortest period of time, as shown in FIG. 6B. The liquid crystal molecules 1 have a nature as a continuous entity, so that the liquid crystal molecules 1 in the entire display pixels fall along an inclined surface of the wall-shaped convex portions 20. The liquid crystal molecules 1 at the spacer 2 remain aligned along the spacer 2. As a result, the liquid crystal molecules 1 in the display pixel axially symmetrically fall with respect to the spacer 2.

Figure 6C:
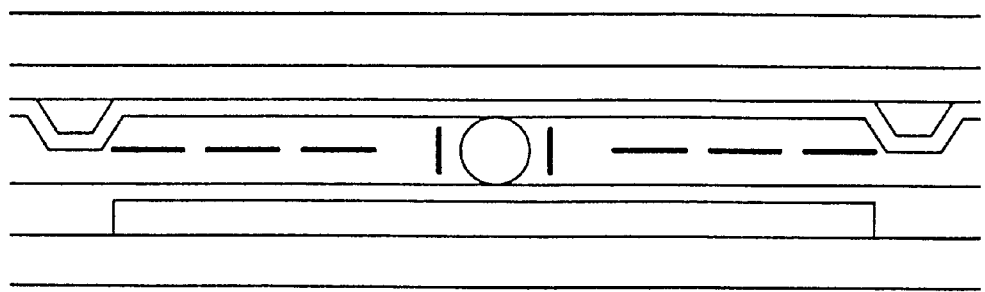

When a saturation voltage is applied to the liquid crystal layer, the liquid crystal molecules 1 are aligned substantially parallel to the substrate, as shown in FIG. 6C. The liquid crystal molecules 1 are axially symmetrically aligned with respect to the spacer 2.

(2) In the case of a liquid crystal material having positive dielectric anisotropy In the case where there are no spacers in the display pixels, when a voltage is not applied to the liquid crystal layer, the liquid crystal molecules are axially symmetrically aligned with respect to a central portion of a domain. When a voltage is applied, the liquid crystal molecules rise in an axially symmetrical direction.

In the case where there is one spacer in a display pixel, when a voltage is not applied to the liquid crystal layer, the liquid crystal molecules are axially symmetrically aligned with respect to the spacer. When a voltage is applied, the liquid crystal molecules rise in an axially symmetrical direction.

(Viewing Angle Characteristics)

The direction in which liquid crystal molecules fall changes by 360° around the center for axial symmetry. Thus, when a viewing angle is tilted, viewing angle characteristics are compensated for in each direction, so that wide viewing angle characteristics are obtained.

Hereinafter, the present invention will be described by way of illustrative embodiments. The present invention is not limited thereto.

Embodiment 1

Figure 7A:
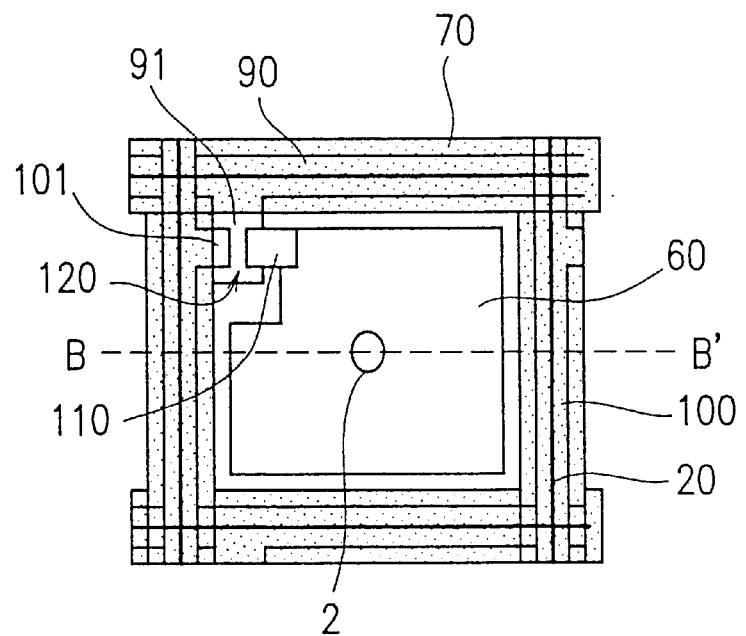
FIGS. 7A and 7B show a structure of a liquid crystal display device in Embodiment 1 of the present invention.
Figure 7B:
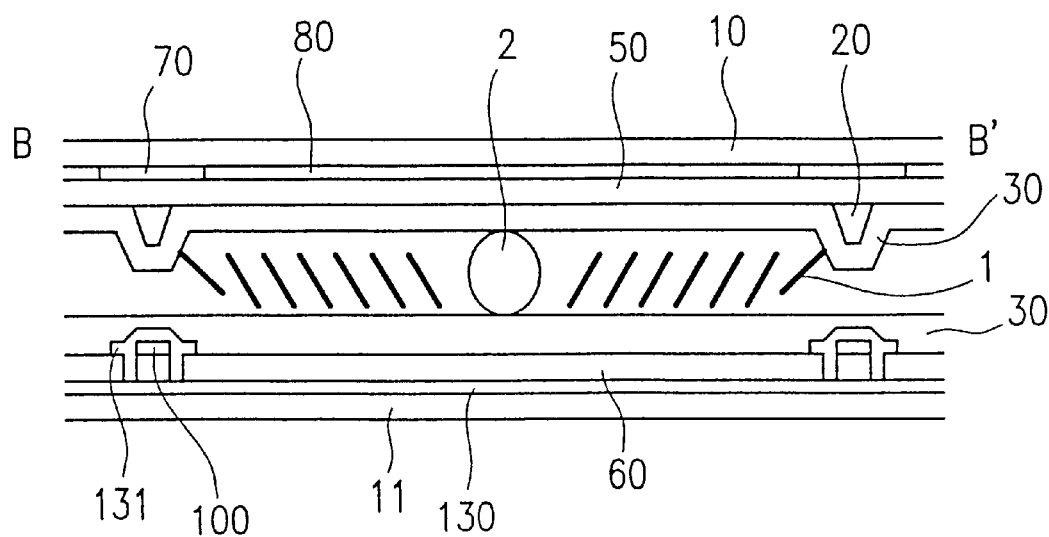
Figure 8A:
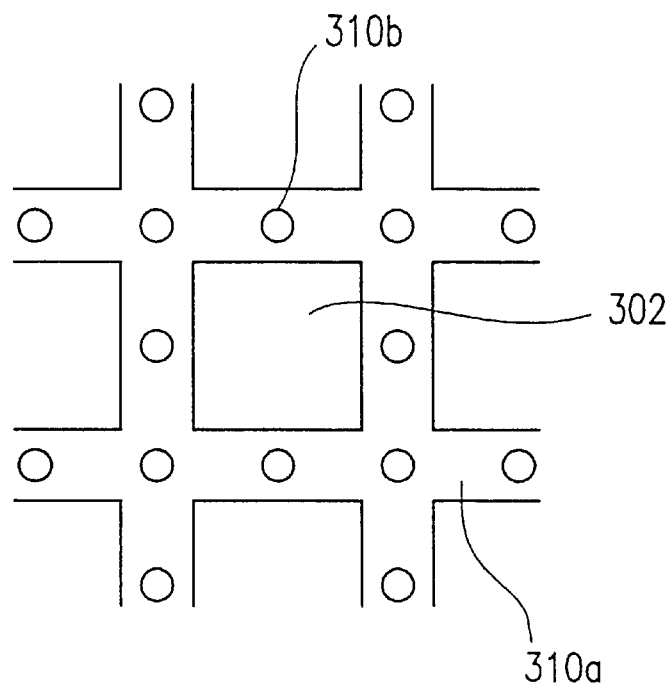
FIGS. 8A and 8B show a structure of a conventional liquid crystal display device.
Figure 8B:
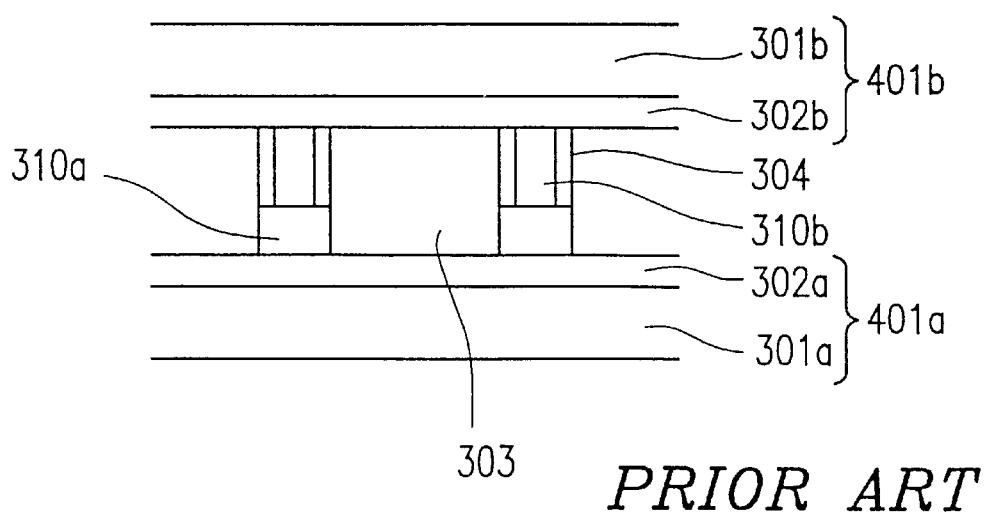

FIG. 7A is a plan view of a liquid crystal display device in Embodiment 1. FIG. 7B is a cross-sectional view of the liquid crystal display device taken along a line B–B' in FIG. 7A under the application of a gray-scale voltage. In these figures, the components which function in the same way as in those in FIGS. 4A and 4B are denoted with the same reference numerals as those therein.

In the above-mentioned liquid crystal display device, an active matrix substrate, on which TFTs 120 and transparent electrodes 60 for display are provided in a matrix, is disposed so as to be opposed to a CF substrate on which coloring portions 80 and a BM 70 are formed, with a liquid crystal layer made of liquid crystal having negative dielectric anisotropy therebetween.

In the active matrix substrate, gate lines 90 and source lines 100 are provided on a glass substrate 11 so as to cross each other. The TFT 120 is provided in the vicinity of each crossed portion of the gate lines 90 and the source lines 100, and the transparent electrode 60 is provided in each region partitioned by the gate lines 90 and the source lines 100.

In the CF substrate, the coloring portions 80 are provided on the glass substrate 10 so as to correspond to each display pixel, and the BM 70 is provided around each display pixel. A common transparent electrode 50 is provided on the coloring portions 80 and the BM 70, and wall-shaped convex portions 20 are provided on the common transparent electrode 50 so as to surround display pixels.

Opposing portions of the electrodes 50 and 60 form display pixels in a matrix, and a spacer 2 is disposed at the central portion of each display pixel.

The above-mentioned liquid crystal display device will be produced as follows.

First, the gate lines 90, the source lines 100, the TFTs 120, and the transparent electrodes 60 are formed on the active matrix substrate by a known method. Then, the coloring portions 80, the BM 70, and the common transparent electrode 50 are formed on the CF substrate.

Next, a resin material (e.g., JAS 100, produced by Japan Synthetic Rubber Co., Ltd.) is coated onto the entire surface of the CF substrate and exposed to light through a mask, followed by development and patterning. The patterned resin material is baked to be cured, whereby the wall-shaped convex portions 20 (thickness: about 2 µm) are formed above the BM 70.

Subsequently, a homeotropic alignment film (e.g., JALS 204, produced by Japan Synthetic Rubber Co., Ltd.) is formed on the surfaces of both the substrates by a printing method.

Thereafter, the spacers 2 (e.g., Micropearl SP-2045, produced by Sekisui Fine Chemical Co., Ltd.) made of plastic are dispersed on the active matrix substrate in such a manner that zero or one spacer 2 is disposed per display pixel by a dry method.

Next, a sealant is printed onto portions other than display regions on the CF substrate. The CF substrate is attached to the active matrix substrate, and both the substrates are baked, whereby a liquid crystal panel is produced.

Nematic liquid crystal (e.g., ZLI 4788-000, produced by Merck & Co., Inc.) having negative dielectric anisotropy is injected into the liquid crystal panel thus obtained to produce a liquid crystal display device.

In the liquid crystal display device, the liquid crystal molecules 1 are aligned in a direction perpendicular to the substrates in the display pixels in an initial state. When a voltage is applied, the liquid crystal molecules 1 are axially symmetrically aligned in the display pixels. At this time, the center for axial symmetry is formed at the position of the spacer 2 in a display pixel where one spacer 2 is provided, and the center for axial symmetry is formed substantially at the central portion in a display pixel where no spacer 2 is provided. The direction in which the liquid crystal molecules 1 rise around the center for axial symmetry changes by 360°, and the viewing angle is compensated for in each direction. Thus, a liquid crystal display device with outstanding viewing angle characteristics is obtained.

Furthermore, in the liquid crystal display device in which the spacer 2 is disposed substantially at the central portion of each display pixel, the center for axial symmetry is observed at the central portion of each display pixel, and roughness is not recognized when a viewing angle is tilted. Thus, the display quality is enhanced.

Embodiment 2

In Embodiment 2, the case of using a liquid crystal material having positive dielectric anisotropy will be described.

The liquid crystal display device in Embodiment 2 has substantially the same structure as that in Embodiment 1 shown in FIGS. 7A and 7B, except that (1) a homeotropic alignment film is not provided and (2) a polymerizable resin material is preferentially separated on the wall-shaped convex portions 20 to form polymer regions outside the display pixels.

The liquid crystal display device in Embodiment 2 is produced as follows.

First, in the same way as in Embodiment 1, and the gate lines 90, the source lines 100, the TFTs 120, and the transparent electrodes 60 are formed on the active matrix substrate by a known method. Then, the coloring portions 80, the BM 70, and the common transparent electrode 50 are formed on the CF substrate.

Next, a resin material (e.g., JAS 100, produced by Japan Synthetic Rubber Co., Ltd.) is coated onto the entire surface of the CF substrate and exposed to light through a mask, followed by development and patterning. The patterned resin material is cured by baking, whereby the wall-shaped convex portions 20 (thickness: about 2 µm) are formed above the BM 70.

Thereafter, the spacers 2 (e.g., Micropearl SP-2045, produced by Sekisui Fine Chemical Co., Ltd.) made of plastic are dispersed on the active matrix substrate in such a manner that zero or one spacer 2 is disposed per display pixel by a dry method.

Next, a sealant is printed onto portions other than display regions on the CF substrate. The CF substrate is attached to the active matrix substrate, and both the substrates are baked, whereby a liquid crystal panel is produced.

A mixture containing about 85.2% by weight of liquid crystal material (e.g., ZLI 4792, produced by Merck & Co., Inc.) having positive dielectric anisotropy, about 0.3% by weight of a chiral agent (e.g., S-811, produced by Merck & Co., Inc.), about 0.5% by weight of a photopolymerization initiator (Irgacure 651), about 4% by weight of a photopolymerization suppressor (p-phenylstyrene), about 3% by weight of a polymerizable resin material (perfluorooctylethyl acrylate), about 5% by weight of a polymerizable resin material (lauryl acrylate), and about 2% by weight of a polymerizable resin material (e.g., R-684, produced by Nippon Kayaku Co., Ltd.) is injected into the liquid crystal panel thus obtained.

Then, the liquid crystal panel is kept at about 110° C. which is equal to or higher than a temperature which renders the mixture uniform. Under this condition, UV-rays are radiated (10 mW/cm$^2$, 5 minutes) through the active matrix substrate under the application of an effective voltage of about 2.5 volts at about 60 Hz, whereby the resin is cured. The liquid crystal panel is cooled to about 40° C. over 5 hours under the application of a voltage. Thereafter, the liquid crystal panel is returned to room temperature, and is irradiated with UV-rays, whereby the resin is completely polymerized.

In the liquid crystal display device thus obtained, the liquid crystal molecules 1 are axially symmetrically aligned in the display pixels in an initial state. When a voltage is applied, the liquid crystal molecules 1 rise in an axial symmetrical direction. Thus, an apparent refractive index when seen in each direction is rendered uniform, and satisfactory viewing angle characteristics are obtained.

Furthermore, at this time, the center for axial symmetry is formed at the position of the spacer 2 in a display pixel where one spacer 2 is provided, and the center for axial symmetry is formed substantially at the central portion in a display pixel where no spacer 2 is provided. Accordingly, an apparent refractive index is sufficiently rendered uniform when seen in each direction, and there is no roughness even when diagonally observed. Thus, the display quality can be enhanced.

As described above, according to the present invention, in the liquid crystal display device in which liquid crystal molecules are axially symmetrically aligned, one center for axial symmetry can be provided in each display pixel. Furthermore, the center for axial symmetry can be disposed at the central portion of each display pixel. Thus, the viewing angle is effectively compensated, and a liquid crystal display device with uniform display characteristics and wide viewing angle characteristics can be realized. In addition, a large amount of developer is not required, which simplifies the production steps and shortens the production time. Therefore, a liquid crystal display device having outstanding display quality can be produced at a relatively low cost with good yield.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device in which a liquid crystal layer made of liquid crystal having negative dielectric anisotropy is provided in a gap between a pair of substrates each having an electrode, wall-shaped convex portions are provided so as to surround display pixels on at least one of the substrates, a homeotropic alignment film is provided on a surface of each of the substrates contacting the liquid crystal layer, liquid crystal molecules in the liquid crystal layer are aligned substantially in a direction perpendicular to the pair of substrates when a voltage is not applied, and the liquid crystal molecules are axially symmetrically aligned in each of the display pixels formed by opposing portions of the electrodes when a voltage is applied, wherein the gap between the substrates is maintained by spacers dispersed on one of the substrates after the alignment film is formed, and the number of spacers in each of the display pixels is zero or one.

2. A liquid crystal display device according to claim 1, wherein one spacer is disposed at a central portion of each of the display pixels.

3. A liquid crystal display device according to claim 1, wherein the pair of substrates comprise an active matrix substrate and a color filter substrate, wherein the wall-shaped convex portions are provided on the color filter substrate, and the spacers are dispersed on the active matrix substrate.

4. A liquid crystal display device in which a liquid crystal layer made of liquid crystal having positive dielectric anisotropy is provided in a gap between a pair of substrates each having an electrode, wall-shaped convex portions are provided so as to surround display pixels on at least one of the substrates, liquid crystal molecules in the liquid crystal layer are axially symmetrically aligned in each of the display pixels formed by opposing portions of the electrodes when no voltage is applied, and the liquid crystal molecules rise in a direction substantially perpendicular to the pair of substrates in an axial symmetrical direction when a voltage is applied, wherein the gap between the substrates is maintained by spacers dispersed on the substrate having no wall-shaped convex portions, and the number of spacers in each of the display pixels is zero or one.

5. A liquid crystal display device according to claim 4, wherein one spacer is disposed at a central portion of each of the display pixels.

6. A liquid crystal display device according to claim 4, wherein the pair of substrates comprise an active matrix substrate and a color filter substrate, wherein the wall-shaped convex portions are provided on the color filter substrate, and the spacers are dispersed on the active matrix substrate.

7. A liquid crystal display device in which a liquid crystal layer made of liquid crystal having positive dielectric anisotropy is provided in a gap between a pair of substrates each having an electrode, wall-shaped convex portions are provided so as to surround display pixels on at least one of the substrates, liquid crystal molecules in the liquid crystal layer are axially symmetrically aligned in each of the display pixels formed by opposing portions of the electrodes when no voltage is applied, and the liquid crystal molecules rise in a direction substantially perpendicular to the pair of substrates in an axial symmetrical direction when a voltage is applied, wherein the gap between the substrates is maintained by spacers dispersed on one of the substrates after the wall-shaped convex portions are formed, and the number of spacers in each of the display pixels is zero or one.

8. A liquid crystal display device according to claim 7, wherein one spacer is disposed at a central portion of each of the display pixels.

9. A liquid crystal display device according to claim 7, wherein the pair of substrates comprise an active matrix substrate and a color filter substrate, wherein the wall-shaped convex portions are provided on the color filter substrate, and the spacers are dispersed on the active matrix substrate.

* * * * *